(12) United States Patent  
Aoshima et al.

(10) Patent No.: US 9,146,653 B2  
(45) Date of Patent: Sep. 29, 2015

(54) METHOD AND APPARATUS FOR EDITING LAYOUT OF OBJECTS

(71) Applicant: FUJIFILM Corporation, Tokyo (JP)

(72) Inventors: Yuzo Aoshima, Tokyo (JP); Samito Nakamura, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 191 days.

(21) Appl. No.: 13/773,511

(22) Filed: Feb. 21, 2013

(65) Prior Publication Data

US 2013/0212506 A1 Aug. 15, 2013

(30) Foreign Application Priority Data

Aug. 27, 2010 (JP) ................. 2010-190727

(51) Int. Cl.
G06F 3/048 (2013.01)
G06F 3/0484 (2013.01)
G06F 3/0488 (2013.01)

(52) U.S. Cl.
CPC .............. *G06F 3/048* (2013.01); *G06F 3/0488* (2013.01); *G06F 3/04845* (2013.01)

(58) Field of Classification Search
CPC .................................. G06F 3/048; G06F 3/041
USPC ....................................................... 715/765
See application file for complete search history.

(56) References Cited

U.S. PATENT DOCUMENTS

| 8,243,035 | B2 | 8/2012 | Abe et al. | |
| 8,745,514 | B1* | 6/2014 | Davidson | 715/766 |
| 2006/0088331 | A1* | 4/2006 | Inoue et al. | 399/81 |
| 2007/0211144 | A1* | 9/2007 | Fujita et al. | 348/142 |

FOREIGN PATENT DOCUMENTS

JP 2010-033455 A 2/2010

OTHER PUBLICATIONS

International Search Report in PCT/JP2011/068124 dated Nov. 15, 2011 (English Translation Thereof).

* cited by examiner

*Primary Examiner* — Peiyong Weng
(74) *Attorney, Agent, or Firm* — McGinn IP Law Group, PLLC.

(57) ABSTRACT

When an image is touched on a touch screen, the image is displayed as if a touched side of the image is pressed down and an opposite side of the touched side is lifted up. Priority levels of peripheral portions of the image are set in accordance with up and down of the image. Rendering priority between images to be overlapped is determined in accordance with a dominant-subordinate relationship between the priority levels of the peripheral portions of the respective images to be in contact. One of the images is displayed in an overlapped portion of the images based on the rendering priority.

12 Claims, 11 Drawing Sheets

METHOD AND APPARATUS FOR EDITING LAYOUT OF OBJECTS

BACKGROUND OF THE INVENTION

1. Field of the Invention

The present invention relates to method and apparatus for editing layout of objects used for creating photobook or the like.

2. Description Related to the Prior Art

Software for taking images, captured with a digital camera, into a computer and creating photobook is known. The software for creating photobook is provided with a layout editing function for moving each image to a desired position on a display screen. An image is moved using an operation input device. The operation input device, for example, a mouse or a touch screen allows an operator intuitive operation.

In the layout editing, an object, for example, an image, to be moved is referred to as an "object". Rendering priority that is a front-back (top-bottom) relationship between objects to be overlapped is determined in the depth direction of the display screen before the objects are overlapped. When overlapped, the objects are rendered in an overlapped state in accordance with the rendering priority. Namely, rendering on the display screen is controlled such that the object with the highest rendering priority is displayed on top and the object(s) underneath the top object is not displayed in an overlapped portion of the objects. To change the rendering priority after the objects are moved and overlapped, the object whose rendering priority is to be changed is selected, and a command, for example, "move to front", "move to back", or "move to top" is executed.

U.S. Pat. No. 8,243,035 (corresponding to Japanese Patent Laid-Open Publication No. 2010-33455) suggests a configuration in which the front-back relationship or rendering priority between the overlapped objects displayed on the touch screen is changed based on a difference in pressure between touch points (pressed points) corresponding to touch inputs onto the touch screen.

The above-described operation to change the rendering priority in the overlapped portion based on the command such as "move to front" or "move to back" is different from the intuitive operation using the mouse or the touch screen. The operation based on the command is complicated because a step for moving the object and a step for changing the rendering priority are separated. In the configuration using the difference in pressure as described in the U.S. Pat. No. 8,243,035, a mechanism for detecting pressure of a touch point on the display screen is necessary. This increases the number of parts and manufacturing cost. In addition, practice is necessary to control pressure of a touch point.

SUMMARY OF THE INVENTION

An object of the present invention is to provide a method and an apparatus for editing a layout of objects, capable of designating rendering priority using intuitive operation and overlapping objects based the rendering priority.

In a method for editing a layout of objects according to the present invention, rendering priority is determined by a setting step and a determining step in the case where at least one of first and second objects on a display screen is pointed by operation of an operation input device and the first and second objects are overlapped by moving the object such that the object follows movement of a pointing position on the object. In the setting step, priority levels, related to overlapping, of respective peripheral portions are set based on the pointing position within the pointed object such that a priority level of at least a peripheral portion of the pointed object, on a pointing position side from a reference point, is set to a subordinate level, and a priority level of at least a peripheral portion of the pointed object, on an opposite side of the pointing position with respect to the reference point, is set to a dominant level. The reference point is set within the pointed object. In the determining step, rendering priority between the first and second objects is determined in accordance with a dominant-subordinate relationship between the priority levels of the peripheral portions, of the respective objects, to come in contact with each other when the first and second objects are overlapped such that one of the objects is displayed in an overlapped portion of the first and second objects. The number of objects may be three or more.

It is preferable that a priority level of a peripheral portion of the object not pointed is set to an intermediate level that is a level between the dominant level and the subordinate level.

It is preferable that the operation input device is a touch screen which an operator touches to provide input.

It is preferable that the touch screen is a multi-touch sensor type capable of detecting touches of the operator.

An apparatus for editing a layout of objects is provided with a display screen, an operation input device, a priority designator, a rendering priority determiner, and a display controller. The display screen displays at least a first object and a second object. The operation input device points at least one of the first and second objects on the display screen, and moves a pointed object on the display screen such that the pointed object follows movement of a pointing position of the pointed object. The priority designator sets priority levels, related to overlapping, of respective peripheral portions based on the pointing position within the pointed object such that the priority designator sets a priority level of at least a peripheral portion of the pointed object, on a pointing position side from a reference point, to a subordinate level and a priority level of at least a peripheral portion of the pointed object, on an opposite side of the pointing position with respect to the reference point, to a dominant level. The reference point is set within the pointed object. The rendering priority determiner determines rendering priority between the first and second objects in accordance with a dominant-subordinate relationship between the priority levels of the peripheral portions, of the respective objects, to come in contact with each other when the first and second objects are overlapped. The display controller displays one of the first and second objects in an overlapped portion of the first and second objects based on the rendering priority.

It is preferable that the priority designator sets a priority level of a peripheral portion of the object not pointed to an intermediate level that is a level between the dominant level and the subordinate level.

It is preferable that the operation input device is a touch screen which operator touches to provide input.

It is preferable that the touch screen is a multi-sensor type capable of detecting touches of the operator.

According to the present invention, the rendering priority is determined by pointing the object, and the object is displayed as if the pointed side of the object is pressed down and the opposite side of the object is lifted up, thus indicative of the top-bottom relationship with another object. Thereby, the objects are overlapped based on the rendering priority with the intuitive operation. The determination of rendering priority and overlapping of objects are carried out together. Thus, operability is improved.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
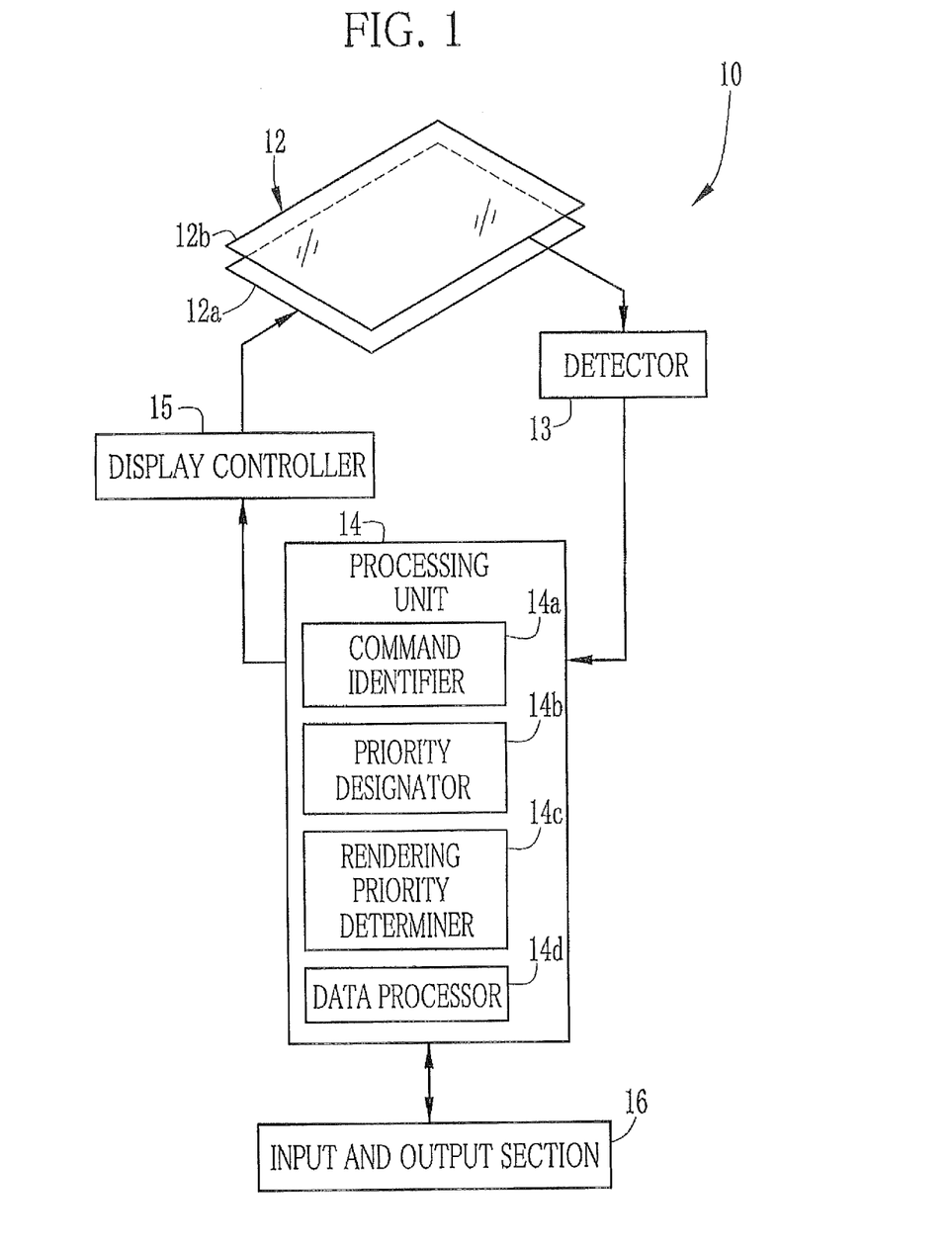
FIG. 1 is a schematic view of a configuration of a layout editing apparatus according to the present invention.

In FIG. 1, a layout editing apparatus 10 edits or changes a layout of images, referred to as objects, in a page of a photobook in this example. The layout editing apparatus 10 is, for example, a general-purpose computer installed with application software which provides layout editing function. The layout editing apparatus 10 is composed of a touch screen 12, a detector 13, a processing unit 14, a display controller 15, and an input and output section 16. A laptop or notebook computer with a touch screen, a desktop personal computer (PC), a tablet computer, or the like is used as the general-purpose computer. Alternatively, the layout editing apparatus 10 exclusively for editing layouts may be used.

The touch screen 12 is composed of a display 12a such as CRT or LCD and a transparent sheet-like touch sensor panel 12b. The display 12a displays a layout screen on which a layout is edited. The touch sensor panel 12b, being an operation input device, detects a touch position (pointing position) of an operator's finger and outputs a detection signal corresponding to the touch position. In this example, the touch sensor panel 12b is a multi-touch sensor panel capable of detecting different touch positions simultaneously. Based on the detection signal from the touch sensor panel 12b, the detector 13 detects and outputs the touch position (coordinates on a screen of the display 12a).

The processing unit 14 controls each section based on a command given by operating the touch screen 12. The processing unit 14 functions as a command identifier 14a, a priority designator 14b, a rendering priority determiner 14c, a data processor 14d, and the like. The command identifier 14a identifies or detects a command of the operation, inputted through the touch sensor panel 12b by the operator, based on the touch position and a change in the touch position outputted from the detector 13. The priority designator 14b sets priority levels, related to overlapping, of peripheral portions (edge portions) in an image. The rendering priority determiner 14c determines rendering priority, between two images to be overlapped on the layout screen, in accordance with a dominant-subordinate relationship between the priority levels of the peripheral portions of the respective images. The data processor 14d produces or changes layout data based on the operation through the touch screen 12. The layout data is composed of information including the data, the size, and the arrangement position of each image to be laid out in a page, and the rendering priority representing a front-back relationship between the overlapped portions of the images.

The input and output section 16 reads the layout data into the layout editing apparatus 10 and outputs the layout data externally. The produced layout data is outputted to a recording medium such as a memory card. The layout data may be outputted to another apparatus such as a printer or a photobook creator through LAN or wireless transmission. Images to be laid out are inputted to the input and output section 16. The images inputted are displayed on the touch screen 12 through the processing unit 14 and the display controller 15.

Upon the input of the layout data produced or changed in the processing unit 14, the display controller 15 drives the display 12a based on the layout data. Thereby, the display controller 15 displays the layout screen on the touch screen 12. When a command to enlarge or reduce the size of the image, to move the image, or to overlap the images, for example, is given by operating the touch screen 12, the display controller 15 makes a change to the image in accordance with the operation, under the control of the processing unit 14. Thereby, the operator recognizes the operation currently performed and the result of the operation in real-time.

Figure 2:
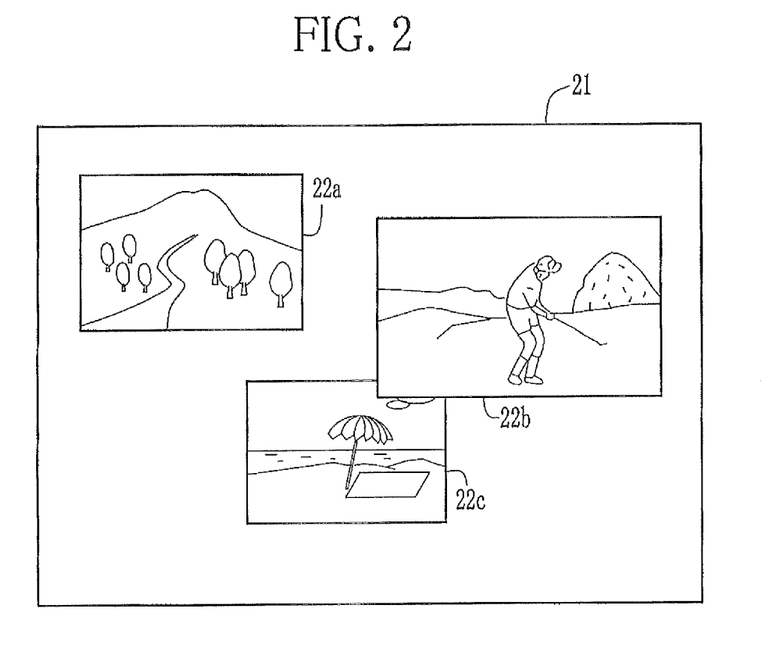
FIG. 2 is an explanatory view of a layout screen by way of example.

In FIG. 2, images 22a to 22c are arranged on a layout screen 21 by way of example. One of the images displayed on the touch screen 12 is pointed (selected) by touching the image with a finger. A position touched with the finger is referred to as the touch position. When the touch position is moved (dragged), the pointed image follows the movement of the touch position.

The image is dragged until it partly overlaps another image. Thereby, the images are displayed in an overlapped layout as shown by the images 22b and 22c. To overlap the images, the rendering priority (front-back relationship) between the images is determined. Based on the rendering priority, which of the images is displayed in the overlapped portion is determined.

In this example, the rendering priority determiner 14c determines a dominant level and a subordinate level between two images. As will be described below, the dominant level, the subordinate level, and an intermediate level between the dominant and subordinate levels are used for determining the rendering priority. The display controller 15 displays the overlapped portion based on the rendering priority between the images such that the image of the dominant level is rendered in preference to the image of the subordinate level. Namely, the overlapped portion of the image of the subordinate level is not displayed while the overlapped portion of the image of the dominant level is displayed. Thereby, a layout in which the images are overlapped as if the image of the dominant level is placed on top of the image of the subordinate level is reproduced. In FIG. 2, the image 22b is at the dominant level, and the image 22c is at the subordinate level.

The rendering priority determiner 14c determines the rendering priority between the images in accordance with the relationship between the priority levels set to the peripheral portions, of the respective images, which come in contact with each other when the images are overlapped. In other words, the dominant-subordinate relationship between the peripheral portions, of the respective images, to be in contact is applied to the entire images. To be more specific, to overlap the images, the images are relatively moved closer to each other, and just before the overlap of the images, the priority levels set to the peripheral portions, of the respective images, to be in contact are compared with each other. In this comparison, the rendering priority of one of the images with the priority level of the peripheral portion higher than the priority level of the peripheral portion of the other image is set to the dominant level. The rendering priority of the other image is set to the subordinate level.

To set a priority level of a peripheral portion of an image, the priority designator 14b sets one of dominant, intermediate, and subordinate levels (in descending order of priority) to the peripheral portion of the image. Note that in a dominant-subordinate relationship relative to the intermediate level, the intermediate level is subordinate to the dominant level, but is dominant to the subordinate level. The rendering priority is thus determined when compared with the intermediate level.

Figure 3:
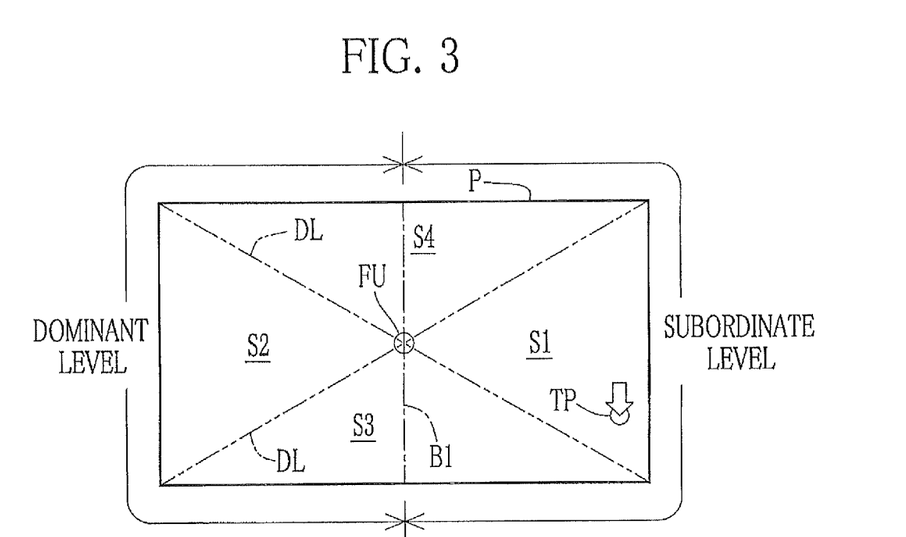
FIG. 3 is an explanatory view illustrating regions set in an image and a boundary for dividing the image into left and right halves.
Figure 4:
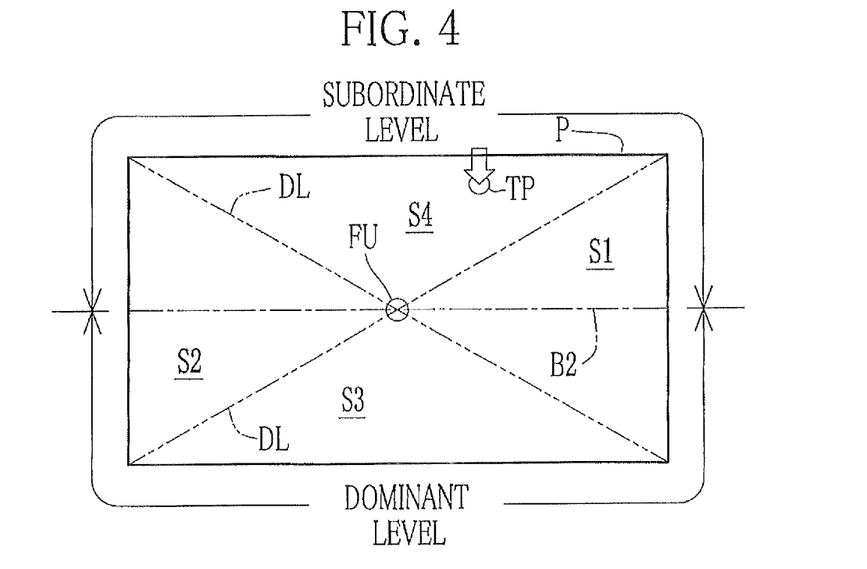
FIG. 4 is an explanatory view illustrating the regions set in the image and a boundary for dividing the image into top and bottom halves.

The priority designator 14b determines the priority level or priority order of a peripheral portion (edge portion) of an image based on a touch position within the image. In this example, as illustrated in FIGS. 3 and 4, a reference point FU is set to the center of a rectangular image P. The image P is segmented into first to fourth regions S1 to S4 by a pair of diagonal lines DL. One of boundaries B1 or B2, which, are mutually orthogonal and both crossing the reference point FU, is set in the image P in accordance with the touch position TP. The boundary B1 is parallel to a pair of opposing sides (one side of the first region S1 and one side of the second region S2) of the image P, and divides the image P into left and right halves. The boundary B2 is parallel to the other pair of opposing sides (one side of the third region S3 and one side of the fourth region S4), and divides the image P into top and bottom halves.

As illustrated in FIG. 3, when the touch position TP is within one of the first and second regions S1 and S2, the boundary B1 is set. The boundary B1 divides the peripheral portion of the image P into two parts. In the image P, the priority level of the peripheral portion on a touch position TP side from the boundary B1 is set to the subordinate level, and the priority level of the peripheral portion on the opposite side of the touch position TP with respect to the boundary B1 is set to the dominant level. As illustrated in FIG. 3, when the touch position TP is within the first region S1 on the right side of the image P, the priority level of the peripheral portion of the right half of the image P is set to the subordinate level. The priority level of the peripheral portion of the left half of the image P is set to the dominant level.

When the touch position TP is within one of the third and fourth regions S3 and S4, the boundary B2 is set. In the image P, the priority level of the peripheral portion on the touch position TP side from the boundary B2 is set to the subordinate level. The priority level of the peripheral portion on the opposite side of the touch position TP with respect to the boundary B2 is set to the dominant level. As illustrated in FIG. 4, when the touch position TP is within the fourth region S4 on the upper side of the image P, the priority level of the peripheral portion of the top half of the image P is set to the subordinate level. The priority level of the peripheral portion of the bottom half of the image P is set to the dominant level.

Thus, the priority level of the peripheral portion of the image P, on the touch position TP side from the reference point FU, is set to the subordinate level. The priority level of the peripheral portion of the image P, on the opposite side of the touch position TP with respect to the reference point FU, is set to the dominant level. Note that the priority level of the entire peripheral portion of the image untouched (not pointed) is set to the intermediate level.

Figure 5:
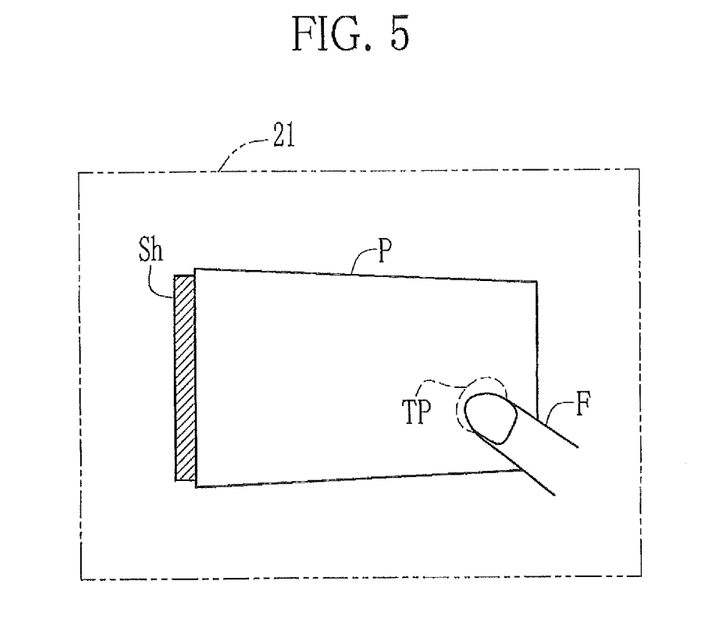
FIG. 5 is an explanatory view illustrating the image being pointed.

As illustrated in FIG. 5, under the control of the processing unit 14, the display controller 15 displays the image P in three-dimensions (3D) as if the image P is pressed down with a finger F and inclined to the touched side, using the boundary B1 or B2 as a fulcrum, while the image P on the layout screen 21 is touched. A symbol "Sh" denotes a shadow displayed on the lifted side of the image P to create a three-dimensional effect.

Figure 6:
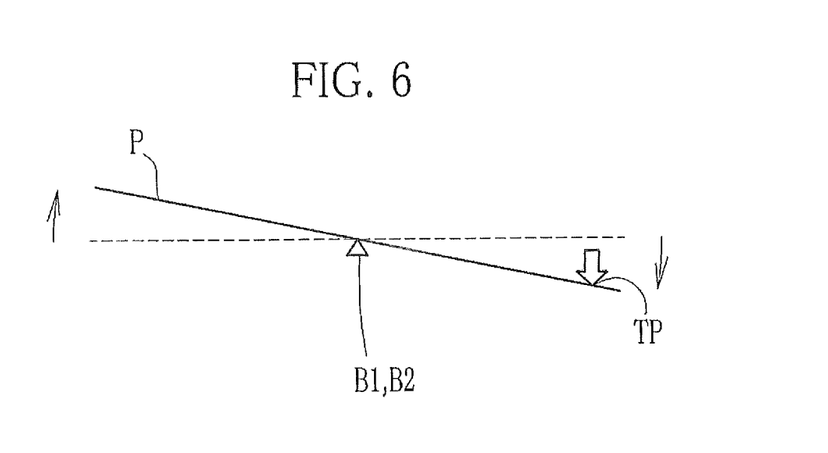
FIG. 6 is an explanatory view illustrating the image inclined with a touch.

As described above, while the image P is touched, the image P is displayed in 3D as if the image P is inclined. As illustrated in FIG. 6, the image P is displayed as if an edge portion on the touch position TP side of the flat image P is pressed down and the opposite edge portion is lifted up, using the boundary B1 or B2 as the fulcrum. Thus, the operation is recognized visually and intuitively.

Figure 7:
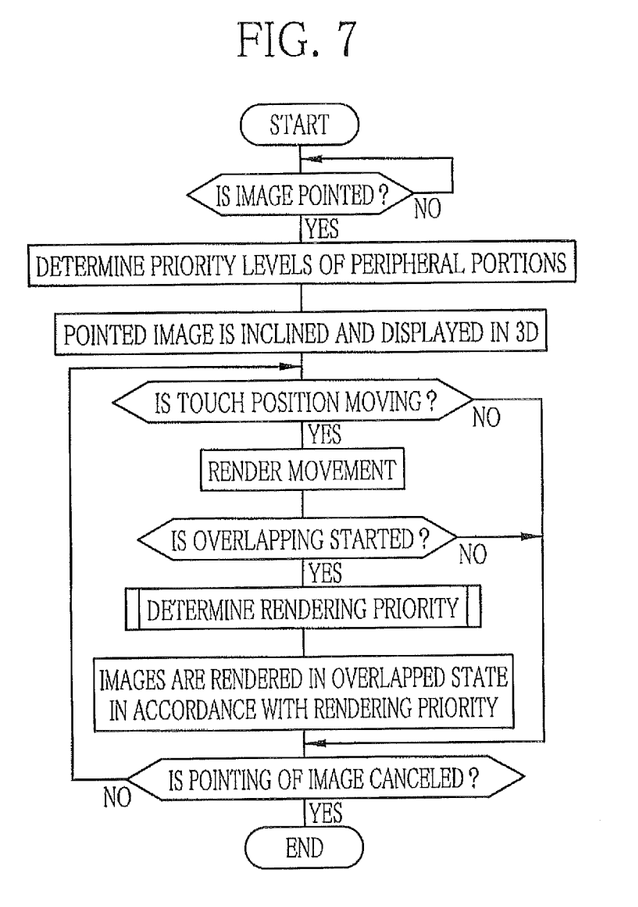
FIG. 7 is a flowchart illustrating steps for overlapping the images.
Figure 8:
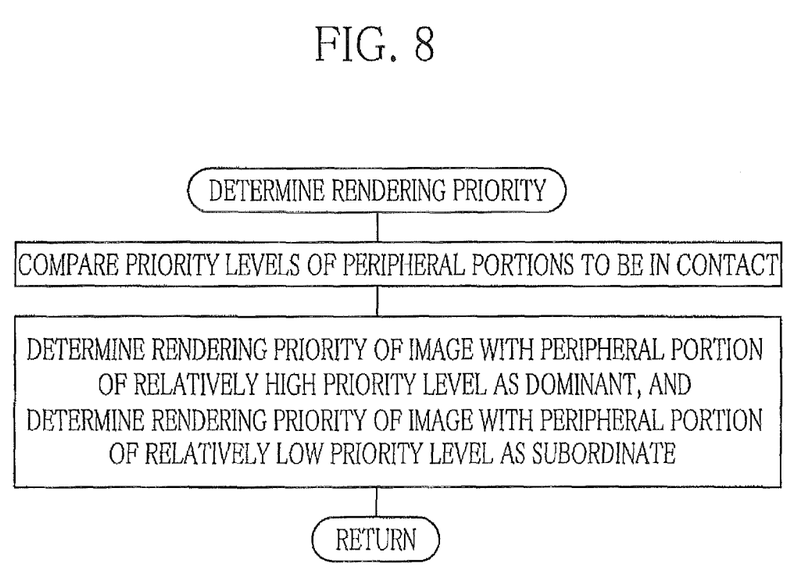
FIG. 8 is a flowchart illustrating steps for determining rendering priority.

Next, referring to FIGS. 7 and 8, the operation of the above configuration is described. The images, being the objects of the layout editing, are inputted from the input and output section 16 by operating the touch screen 12 and displayed on the layout screen 21.

To partly overlap the images, one of the images (the inside of the image) on the touch screen 12 is touched (pointed) with a finger. Alternatively, both of the images may be pointed. One of the images may be pointed and moved and then the other may be pointed.

As illustrated in FIG. 7, when one of the images is pointed, the processing unit 14 sets the priority levels of the peripheral portions in the pointed image. First, based on the touch position TP detected from the touch screen 12, it is determined in which one of the first to fourth regions S1 to S4 the touch position TP is located.

For example, as illustrated in FIG. 3, when the touch position TP is within the first region S1, the boundary B1 that divides the image P into left and right halves is set. The priority level of the peripheral portion of the right half of the image P including the first region S1 is set to the subordinate level. The priority level of the peripheral portion of the left half of the image P including the second region S2 is set to the dominant level. When the touch position TP is within the second region S2, the boundary B1 is set. In this case, on the other hand, the priority level of the peripheral portion of the right half of the image P including the first region S1 is set to the dominant level. The priority level of the peripheral portion of the left half of the image P including the second region S2 is set to the subordinate level.

As illustrated in FIG. 4, when the touch position TP is within the fourth region S4, the boundary B2 that divides the image P into top and bottom halves is set. The priority level of the peripheral portion of the bottom half of the image P including the third region S3 is set to the dominant level. The priority level of the peripheral portion of the top half of the image P including the fourth region S4 is set to the subordinate level. When the touch position TP is within the third region S3, the boundary B2 is set. The priority level of the peripheral portion of the bottom half of the image P including the third region S3 is set to the subordinate level. The priority level of the peripheral portion of the top half of the image P including the fourth region S4 is set to the dominant level.

When the priority levels of the peripheral portions of the pointed image are set as described above, the display controller 15 displays the image P in an inclined state in 3D as if the peripheral portion of the subordinate level is pressed down (toward the back of the touch screen 12) with the touch and the opposite peripheral portion of the dominant level is lifted up (toward the front of the touch screen 12). The boundary serves as the fulcrum.

When two images are pointed, it is also determined in which one of the first to fourth regions S1 to S4 of the other image the touch position TP, detected from the touch screen 12, is located. The priority levels are set or assigned to the peripheral portions of the other image based on the touch position TP. Thus, the other image is also displayed in the inclined state in 3D with the touch.

Thereafter, the operator moves the finger, pointing the image, to move the touch position. Thereby, the image is moved. One or both of the images to be overlapped are moved to be closer to each other. When the processing unit 14 detects the movement of the touch position located within one of the regions of the image, the display position of the image, controlled by the display controller 15, is changed while the relationship between the image and the touch position is maintained. Thereby, the display position of the image is changed so as to follow the movement of the touch position on the touch screen 12.

The operator further moves one or both of the images to overlap the desired portions of the images while monitoring the positional relationship between the images, being the objects, displayed on the touch screen 12.

When the images come in contact and start overlapping on the touch screen 12, the processing unit 14 determines the rendering priority. Note that whether the overlapping is started or not is detected by referring to coordinates indicating the areas of the images on the touch screen 12.

As illustrated in FIG. 8, the priority levels, set as described above, of the peripheral portions of the images to be in contact are compared with each other. In this comparison, the relative dominant-subordinate relationship between the priority levels is determined. Hence, when one of the priority levels is at the dominant level and the other is at the intermediate or subordinate level, the one (the dominant level) acts as the dominant level, and the other (intermediate or subordinate level) acts as the subordinate level. When one of the priority levels is at the intermediate level and the other is at the subordinate level, the one (intermediate level) acts as the dominant level and the other (subordinate level) acts as the subordinate level. As a result of the comparison, the rendering priority of one of the images with the peripheral portion of the dominant level is determined to be at the dominant level. The rendering priority of the other image with the peripheral portion of the subordinate level is determined to be at the subordinate level. Thus, the rendering priority is determined.

Note that, when the priority levels are the same, the rendering order may be determined by judging a relative dominant-subordinate relationship in accordance with the sizes of the images, the order of inputting the images, or the order of pointing the images, for example.

After the rendering priority is determined, the rendering is performed such that only the image with the rendering priority of the dominant level is displayed and the image with the rendering priority of the subordinate level is not displayed in the overlapped portion of the images. Thereby, the images are displayed as if the image with the rendering priority of the dominant level is placed on top of the image with the rendering priority of the subordinate level.

After the images are relatively moved to achieve a desired overlapping state, the operator lifts the finger from the touch screen 12. Thereby, the pointing is cancelled and the layout is fixed.

Note that, after the images are overlapped, when one or both of the overlapped images are pointed and moved in a direction to be relatively apart from each other and the images are separated, each image is displayed entirely.

FIGS. 9A to 13B illustrate specific examples of overlapping the images P1 and P2 in the above-described configuration. In the example illustrated in FIGS. 9A and 9B, only the image P1 is pointed and moved to overlap the still image P2. As illustrated in the example in FIG. 9A, the first region S1 of the image P1 is touched (pointed). The priority level of the peripheral portion of the left half of the image P1 from the boundary B1 is set to the dominant level. The priority level of the peripheral portion of the right half of the image P1 from the boundary B1 is set to the subordinate level. The image P2 is not pointed, so that the priority level of the entire periphery portion of the image P2 is set to the intermediate level.

The image P1 is moved in a leftward direction by moving the touch position so as to be overlapped onto the still image P2 disposed left to the image P1. Thereby, the peripheral portion of the left half of the image P1 comes in contact with the peripheral portion of the image P2 and overlapping is started. The priority level of the peripheral portion of the left half of the image P1 is at the dominant level. The priority level of the peripheral portion of the image P2 is at the intermediate level. Hence, the rendering priority of the image P1 is at the dominant level. The rendering priority of the image P2 is at the subordinate level. In this case, as illustrated in FIG. 9B, the image P1 is displayed while the image P2 is not displayed in the overlapped portion of the images P1 and P2.

Figure 9A:
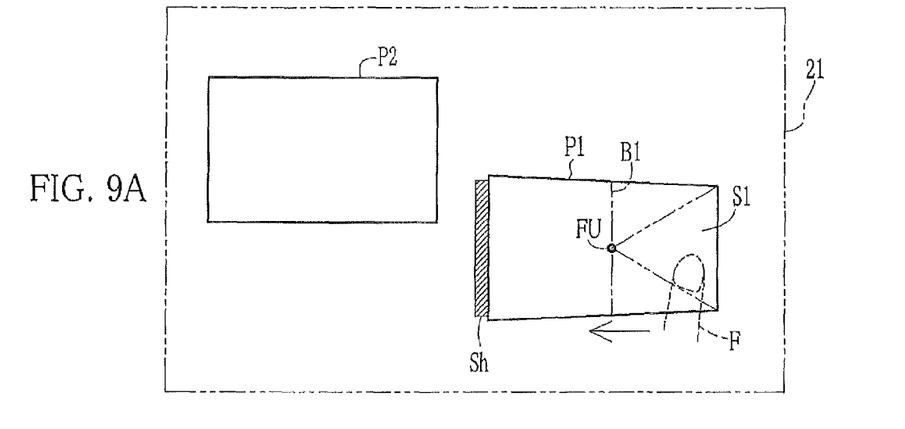
FIGS. 9A-9B are explanatory views of an example in which an image with its first region pointed is moved and overlapped onto a still image.
Figure 9B:
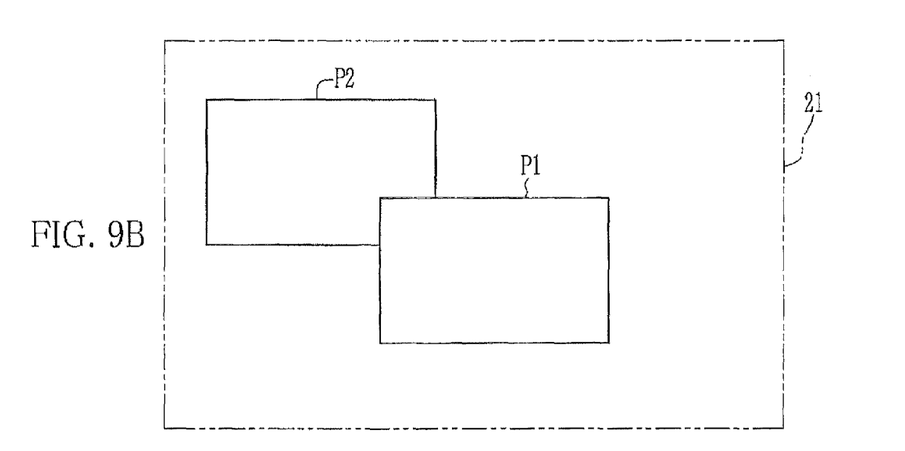
Figure 10A:
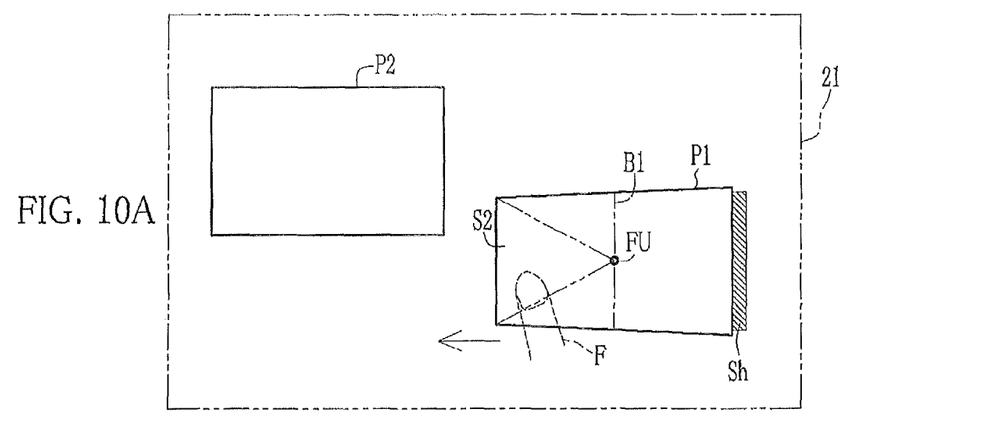
FIGS. 10A-10B are explanatory views of an example in which an image with its second region pointed is moved and overlapped onto a still image.
Figure 10B:
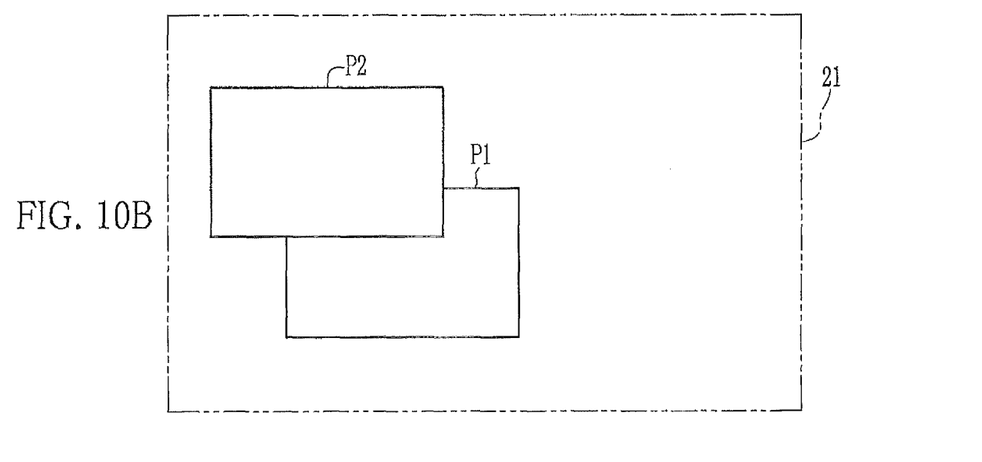

An example illustrated in FIGS. 10A and 10B is similar to the example illustrated in FIGS. 9A and 9B, except that the second region S2 of the image P1 is pointed and moved. As illustrated in FIG. 10A, because the second region S2 of the image P1 is pointed, the priority level of the peripheral portion of the left half of the image P1 from the boundary B1 is at the subordinate level. The priority level of the peripheral portion of the right half is at the dominant level.

The image P1 is moved in a leftward direction so as to overlap the image P2. Thereby, the peripheral portion of the left half of the image P1 comes in contact with the peripheral portion of the image P2 to start overlapping. The priority level of the peripheral portion of the left half of the image P1 is at the subordinate level. Accordingly, the rendering priority of the image P1 is at the subordinate level. The priority level of the peripheral portion of the image P2 is at the intermediate level The rendering priority of the image P2 is at the dominant level. In this case, as illustrated in FIG. 10B, the image P2 is displayed while the image P1 is not displayed in the overlapped portion of the images P1 and P2.

Figure 11A:
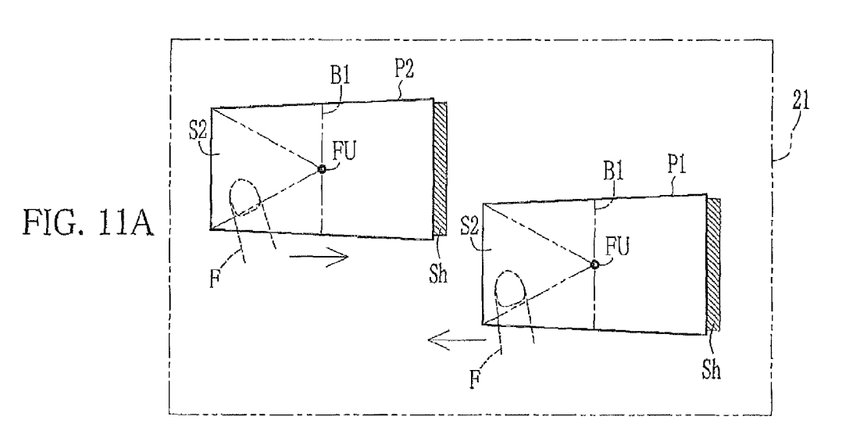
FIGS. 11A-11B are explanatory views of an example in which both images are pointed, moved, and overlapped with each other.
Figure 11B:
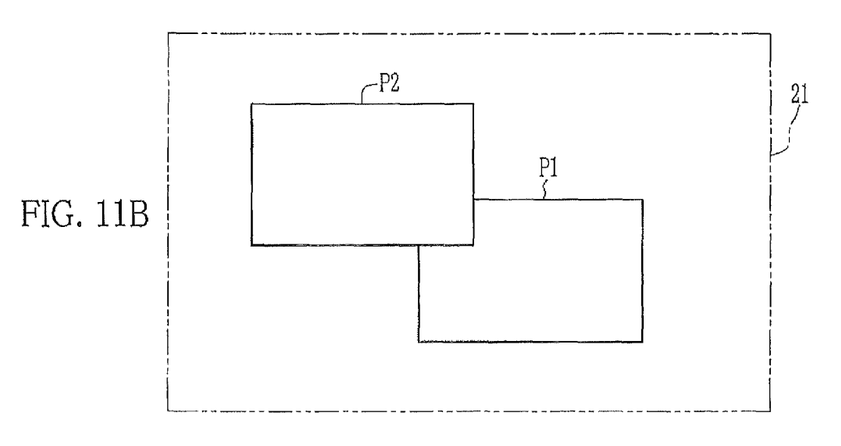

In the example illustrated in FIGS. 11A and 11B, both of the images P1 and P2 are pointed and moved to overlap each other. As illustrated in FIG. 11A, the second region S2 in each of the images P1 and P2 is touched (pointed). In each of the images P1 and P2, the priority level of the peripheral portion of the left half from the boundary B1 is at the subordinate level and the priority level of the peripheral portion of the right half is at the dominant level.

The image P1 is moved in a leftward direction and the image P2 is moved in a rightward direction by moving the respective touch positions so as to overlap each other. Thereby, the peripheral portion of the left half of the image P1 and the peripheral portion of the right half of the image P2 come in contact with each other to start overlapping. The priority level of the peripheral portion of the left half of the image P1 is at the subordinate level. The priority level of the peripheral portion of the right half of the image P2 is at the dominant level. Accordingly, the rendering priority of the image P1 is at the subordinate level. The rendering priority of the image P2 is at the dominant level. In this case, as illustrated in FIG. 11B, the image P2 is displayed while the image P1 is not displayed in the overlapped portion of the images P1 and P2. Note that the images P1 and P2 are displayed in a similar manner when only one of the images P1 and P2 is moved to overlap the other after both of the images P1 and P2 are pointed.

Figure 12A:
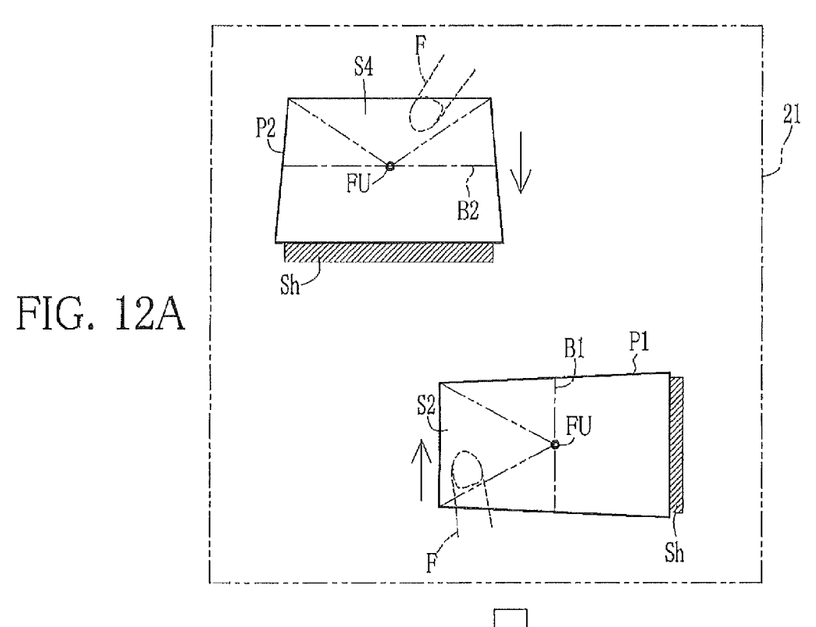
FIGS. 12A-12B are explanatory views of an example in which images with respective mutually orthogonal boundaries are moved and overlapped with each other.
Figure 12B:
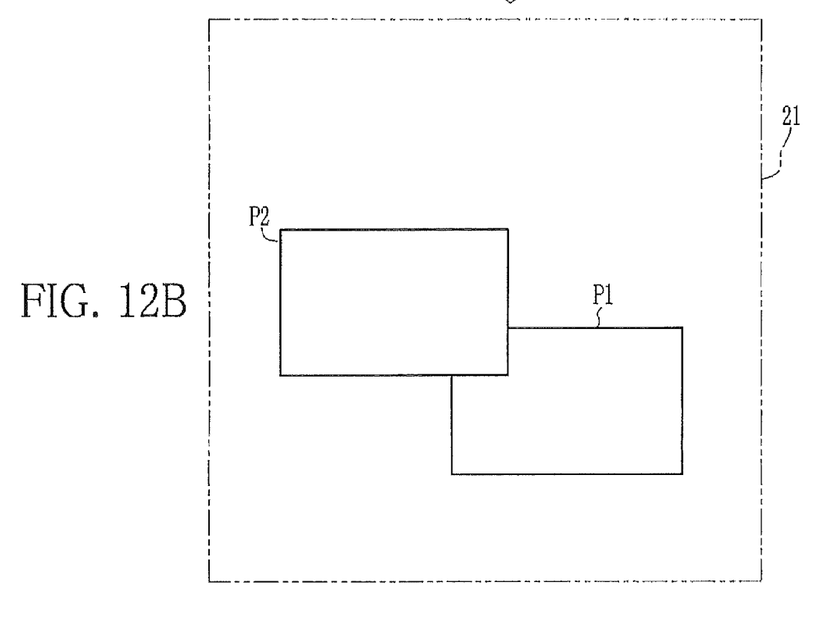

An example illustrated in FIGS. 12A and 12B is similar to the example illustrated in FIGS. 11A and 11B in that both of the images P1 and P2 are pointed and moved. However, the directions of the boundaries in the respective images P1 and P2 are different. As illustrated in FIG. 12A, the image P1 is pointed (selected) by touching its second region S2. The image P2 is pointed (selected) by touching its fourth region S4. Accordingly, in the image P1, the boundary B1 that divides the image P1 into the left and right halves is set. In the image P2, the boundary B2 that divides the image P2 into the top and bottom halves is set. In the image P1, the priority level of the peripheral portion of the left half is at the subordinate level and the priority level of the peripheral portion of the right half is at the dominant level. In the image P2, the priority level of the peripheral portion of the top half is at the subordinate level and the priority level of the peripheral portion of the bottom half is at the dominant level.

The image P1 is moved in an upward direction and the image P2, located above the image P1, is moved in a downward direction by moving the respective touch positions such that the upper peripheral portion of the left half of the image P1 and the lower peripheral portion of the image P2 come in contact with each other to start overlapping. Because the priority level of the peripheral portion of the left half of the image P1 is at the subordinate level and the priority level of the peripheral portion of the image P2 is at the dominant level, the rendering priority of the image P1 is at the subordinate level and the rendering priority of the image P2 is at the dominant level.

Hence, as illustrated in FIG. 12B, the images P1 and P2 are overlapped such that the image P2 is displayed while the image P1 is not displayed in the overlapped portion. Note that the images P1 and P2 are displayed in a similar manner when both of the images P1 and P2 are pointed but only one of them is moved to overlap the other.

Figure 13A:
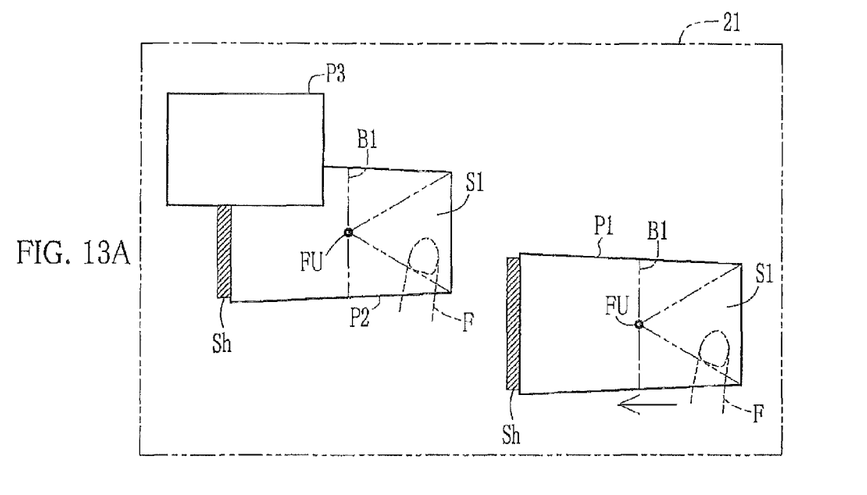
FIGS. 13A-13B are explanatory views of an example in which an image is overlapped onto an image which overlaps another image.
Figure 13B:
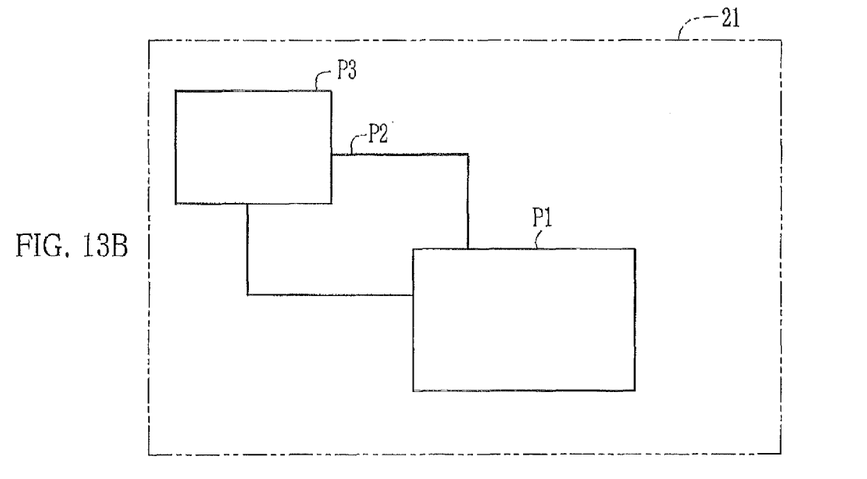

An example in FIGS. 13A and 13B illustrates the operation to overlap the image P1 onto the image P2 that partly overlaps the image P3. As illustrated in FIG. 13A, the image P2 is arranged with its upper left portion overlapping the image P3. Note that, in this example, the rendering priority of the image P2 is subordinate to that of the image P3. Alternatively, the rendering priority of the image P2 may be dominant to that of the image P3. Each of the images P1 and P2 is pointed (selected) by touching the first region S1. Hence, in each of the images P1 and P2, the priority level of the peripheral portion of the left half from the boundary B1 is at the dominant level and the priority level of the peripheral portion of the right half from the boundary B1 is at the subordinate level. By moving the touch position on the image P1, the image P1 is moved in a leftward direction to overlap the image P2 located left to the image P1. Thus, the image P1 with the rendering priority at the dominant level is overlapped onto the image P2 with the rendering priority at the subordinate level.

Thereby, in a layout illustrated in FIG. 13B, a part of the image P3, dominant to the image P2, is overlapped onto the upper left portion of the image P2. A part of the image P1, dominant to the image P2, is overlapped onto the lower right portion of the image P2. Note that when similar operation is performed after the image P2 is pointed (selected) by touching its second region S2, or the image P1 is pointed (selected) by touching its second region S2 without pointing the image P2, a lower right portion of the image P2 is overlapped onto a part of the image P1 which is subordinate to the image P2.

In the example of FIGS. 13A and 13B, the images P2 and P3 are not moved. Alternatively, the images P2 and P3 may be moved integrally when the image P2 is pointed and moved.

In the above embodiments, the rectangular image is described as the object of the layout editing. The shape of an image may be polygonal, circular, elliptical, star-like, cloud-like, or curved, for example.

Figure 14:
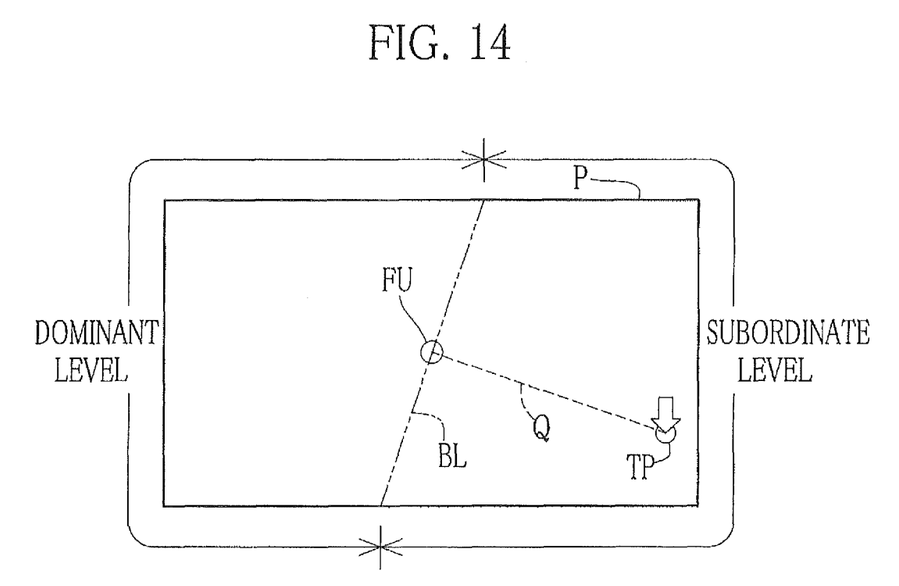
FIG. 14 is an explanatory view of another example of setting priority levels of peripheral portions.

In the example illustrated in FIG. 14, the reference point FU is set to the center point of the image P, and the boundary BL is set. The boundary BL crosses the reference point FU and is orthogonal to a straight line Q between the touch position TP and the reference point FU. The priority level of the peripheral portion on the touch position TP side from the boundary BL is set to the subordinate level. The priority level of the peripheral portion on the opposite side with respect to the boundary BL is set to the dominant level. Note that, in this example, the reference point FU is set to the center of the image P. The reference point FU may be set to any desired point. The reference point FU may be the center of gravity of an image. Setting the boundary BL and the reference point FU in this manner is effective especially when the shape of the image is circular, elliptical, star-like, cloud-like, indeterminate, or the like.

As described above, in the present invention, the priority level of the peripheral portion of the image is determined based on the touch position within the pointed image. The priority level of at least a peripheral portion of the image, on the touch position side from the reference point within the image, is set to the subordinate level. The priority level of at least a peripheral portion of the image, on the opposite side with respect to the reference point, is set to the dominant level.

In the above embodiments, the touch screen is used as the operation input device. An operation input device other than the touch screen, for example, a mouse can be used if similar operation is possible. When the mouse is used, an image is pointed by placing a cursor onto the image on a screen with the operation of the mouse, and a mouse button is clicked. Thereby, the image is pointed (selected). The position of the cursor at the time the mouse button is clicked corresponds to the pointing position. Usually, only one mouse is connected to a PC or the like. The single mouse allows pointing operation of a single image. When two images can be pointed using two mouses, the operation similar to that using the multi-touch sensor of the above embodiments is performed.

In the above embodiments, the objects are the images by way of example. Alternatively or in addition, the objects may be letters, illustrations, icons, or windows.

Various changes and modifications are possible in the present invention and may be understood to be within the present invention.

What is claimed is:

1. A method for editing a layout of objects, at least one of first and second objects on the display screen being pointed by operation of an operation input device, a pointed object being moved so as to follow movement of a pointing position of the pointed object, the overlapped first and second objects being displayed based on rendering priority, the method comprising:

setting priority levels, related to overlapping, of respective peripheral portions based only on the pointing position within the pointed object such that a priority level of at least a peripheral portion of the pointed object, on a pointing position side from a reference point, is always set to a subordinate level and a priority level of at least a peripheral portion of the pointed object, on an opposite side of the pointing position with respect to the reference point, is always set to a dominant level, the reference point being set within the pointed object; and determining rendering priority between the first and second objects in accordance with a dominant-subordinate relationship between the priority levels of the peripheral portions, of the respective objects, to come in contact with each other when the first and second objects are overlapped such that one of the objects is displayed in an overlapped portion of the first and second objects, wherein the pointed object has a rectangular shape and the reference point is set to a center of the pointed object, wherein the pointed object is segmented into first to fourth regions by a pair of diagonal lines thereof, the first to fourth regions including first to fourth sides of the pointed object respectively, the first side opposing to the second side, the third side opposing to the fourth side, wherein in case of the pointing position being within one of the first and second regions, the peripheral portion of the pointed object is divided into two parts by a first boundary passing through the reference point and being parallel to the first and second sides, a priority level of the peripheral portion on a pointing position side from the first boundary is set to a subordinate level, and a priority level of the peripheral portion on an opposite side of the pointing position with respect to the first boundary is set to a dominant level, and wherein in case of the pointing position being within one of the third and fourth regions, the peripheral portion of the pointed object is divided into two parts by a second boundary passing through the reference point and being parallel to the third and fourth sides, a priority level of the peripheral portion on a pointing position side from the second boundary is set to a subordinate level, and a priority level of the peripheral portion on an opposite side of the pointing position with respect to the second boundary is set to a dominant level.

2. The method of claim 1, wherein a priority level of a peripheral portion of the object not pointed is set to an intermediate level that comprises a level between the dominant level and the subordinate level.

3. The method of claim 1, wherein the operation input device comprises a touch screen which an operator touches to provide input.

4. The method of claim 2, wherein the operation input device comprises a touch screen which an operator touches to provide input.

5. The method of claim 3, wherein the touch screen comprises a multi-touch sensor type capable of detecting touches of the operator.

6. The method of claim 4, wherein the touch screen comprises a multi-touch sensor type capable of detecting touches of the operator.

7. An apparatus for editing a layout of objects comprising:
a display screen for displaying at least a first object and a second object;
an operation input device for pointing at least one of the first and second objects on the display screen, and moving a pointed object on the display screen such that the pointed object follows movement of a pointing position of the pointed object;
a priority designator for setting priority levels, related to overlapping, of respective peripheral portions based only on the pointing position within the pointed object such that a priority level of at least a peripheral portion of the pointed object, on a pointing position side from a reference point, is always set to a subordinate level and a priority level of at least a peripheral portion of the pointed object, on an opposite side of the pointing position with respect to the reference point, is always set to a dominant level, the reference point being set within the pointed object;
a rendering priority determiner for determining rendering priority between the first and second objects in accordance with a dominant-subordinate relationship between the priority levels of the peripheral portions, of the respective objects, to come in contact with each other when the first and second objects are overlapped; and
a display controller for displaying one of the first and second objects in an overlapped portion of the first and second objects based on the rendering priority, wherein the pointed object has a rectangular shape and the reference point is set to a center of the pointed object, wherein the pointed object is segmented into first to fourth regions by a pair of diagonal lines thereof, the first to fourth regions including first to fourth sides of the pointed object respectively, the first side opposing to the second side, the third side opposing to the fourth side, wherein in case of the pointing position being within one of the first and second regions, the peripheral portion of the pointed object is divided into two parts by a first boundary passing through the reference point and being parallel to the first and second sides, a priority level of the peripheral portion on a pointing position side from the first boundary is set to a subordinate level, and a priority level of the peripheral portion on an opposite side of the pointing position with respect to the first boundary is set to a dominant level, and wherein in case of the pointing position being within one of the third and fourth regions, the peripheral portion of the pointed object is divided into two parts by a second boundary passing through the reference point and being parallel to the third and fourth sides, a priority level of the peripheral portion on a pointing position side from the second boundary is set to a subordinate level, and a priority level of the peripheral portion on an opposite side of the pointing position with respect to the second boundary is set to a dominant level.

8. The apparatus of claim 7, wherein the priority designator sets a priority level of a peripheral portion of the object not pointed to an intermediate level that comprises a level between the dominant level and the subordinate level.

9. The apparatus of claim 7, wherein the operation input device comprises a touch screen which operator touches to provide input.

10. The apparatus of claim 8, wherein the operation input device comprises a touch screen which operator touches to provide input.

11. The apparatus of claim 9, wherein the touch screen comprises a multi-sensor type capable of detecting touches of the operator.

12. The apparatus of claim 10, wherein the touch screen comprises a multi-sensor type capable of detecting touches of the operator.

* * * * *